Patented July 27, 1937

2,087,962

UNITED STATES PATENT OFFICE 2,087,962

METHOD OF CONTROLLING VISCOSITY IN EVAPORATED MILK

Charles O. Ball, River Forest, Ill., assignor to American Can Company, New York, N. Y., a corporation of New Jersey No Drawing. Application April 12, 1934, Serial No. 720,315

2 Claims. (Cl. 99—184)

The present invention relates to a method of controlling the viscosity of evaporated milk, and has particular reference to the evaporation of the milk to a degree of relatively high total solids content and to the use of a relatively high or violent agitation in a subsequent sterilizing step which is at a relatively high temperature and a short time so that a desired viscosity and an improved color and taste is obtained in the final product.

Heretofore sterilizing processes for evaporated milk have involved comparatively long times of holding at a temperature for example of 240°. The holding time for that temperature plus the time required for raising the sterilizer and the milk to that temperature may comprise for example 35 minutes. This example of heat treatment (total 35 minutes, sterilizing temperature 240°) gives what is usually thought to be the best combination among those combinations which are adequate for sterilization and which give satisfactory viscosity and smoothness of texture with a moderate amount of agitation.

It is well known that evaporated milk assumes a caramelized or cooked taste and takes on a darker color as a result of the sterilization heat process. It is believed that most people regard these characteristics as undesirable. The ordinary favored process referred to, consisting of a total time of approximately 35 minutes, imparts these characteristics to a marked degree.

Attempts to reduce these undesirable effects are constantly being made. Such attempts have included the reduction in time of sterilization with or without an increase in temperature. This has invariably resulted in such a lowering of viscosity of the processed milk and such an attendant increase in cream separation during storage that the resulting product is not satisfactory as a practical commercial evaporated milk. A reduction in time has often introduced further dangers of understerilization and resulting spoilage has been the result.

In regard to the amount of agitation to which cans of evaporated milk are subjected during the sterilizing process in commercial practices the following quotation is taken from page 743 of Majonnier and Troy's "The Technical Control of Dairy Products" (1925), a foremost authority on the packing of evaporated milk:

"Too rapid reeling tends to destroy the viscosity and to produce a grainy finished product. . . . The proper speed of the reel is from six to ten turns per minute, depending upon the diameter of the sterilizer."

Leading manufacturers of sterilization machinery which is extensively used in commercial methods recommend a reeling of from four to ten turns per minute.

In my pending application Serial No. 714,326, filed in the United States Patent Office March 6, 1934, on "Method of controlling viscosity in evaporated milk", I have disclosed a method of control by using acid wherein it is possible to vary these elements of time, temperature and agitation of commercial practice and at the same time obtain adequate sterilization, desired viscosity and improved color and taste.

The instant method relates to different procedure which deals with the raw milk without the addition of acid and by means of the method steps herein enumerated the same desirable characteristics (i. e., sterilization, viscosity, color and taste) are obtained in the final product, this being done by controlling the steps in the evaporation and sterilization of the milk by which higher total solids content of the milk is had and this evaporated product is then processed at a high degree of heat, but very rapidly, while a violent agitation of the milk is maintained.

Prior to my inventions, as far as can be determined, no satisfactory results have been obtained in producing evaporated milk free from dark color and caramelization. In the instant method an evaporated milk is obtained which is practically without caramelization or cooked taste and is substantially without any darkening of color, thus more nearly resembling the natural milk.

This product by the addition of an amount of water equal to that extracted from the raw milk in the evaporating step produces a milk very similar to bottled pasteurized milk. This fully sterile evaporated product of the present invention thus opens up a new field of use and it is believed offers a milk, when so diluted with water, that will meet all of the present requirements of bottled pasteurized milk. This milk, unlike the bottled milk, may be kept indefinitely while sealed in the can, and is only brought back to natural milk consistency by the addition of water as it is used.

An object of the present invention, therefore, is the provision of a method of canning wherein the viscosity of the canned evaporated milk is controlled by the use of a predetermined degree of evaporation and a predetermined degree of violent agitation during a flash sterilization at a high temperature.

A further object is the provision of a method of canning evaporated milk which produces a sterile concentrated evaporated milk which when added to water produces a satisfactory substitute for bottled pasteurized milk.

In order to more clearly set forth the instant invention a detailed procedure of evaporating, canning and sterilizing of the milk as it applies to one set of conditions will be given by way of example and comments will be made in connection with each step.

The raw milk is first heated in a step called forewarming. Forewarming may be done in any suitable manner as passing the milk through a forewarming tank as in present commercial precedure.

After forewarming, the milk is evaporated to a relatively high total solids content. This involves introducing the milk into vacuum pans in the usual manner. The removal of water from the forewarmed milk is continued until the total solids content is between 29 and 35 per cent. This is well above the usual American standards requirement of 25.5 per cent.

The evaporation process is followed by homogenization, this also being a usual step in evaporated milk processes. After homogenization the milk is cooled in any suitable manner. In commercial operations in present use the evaporated milk is received and stored in tanks until ready for canning and the same action is herein followed.

The next step is the filling of the milk in cans, this being done by suitable filling machines, many makes of which are now on the market. The filled cans are then sealed.

In the sterilization process which now follows, higher temperature is employed than in the usual methods of processing evaporated milk. The temperature used is between 255° and 275°. It is necessary to obtain complete sterilization and this fact will largely dictate the exact heat values used. Even the lowest suggested temperature of 255° is considerably above the ordinary processing temperature range of 240 to 245 degrees used in present day commercial methods.

The time of sterilization at this high heat will depend upon the degree of temperature. For the temperature range of 255 to 275 degrees the time will possibly vary from 15 minutes at the lower heat to less than three minutes at 275 degrees. Under ideal conditions the flash heat of 275 degrees for three minutes or less is recommended.

The shortening of sterilizing time consistent with complete sterilization presents the optimum of conditions for maintaining the natural milk color and flavor and milk so processed has conclusively shown that the objectionable darkening in color of commercial evaporated milk and the caramel taste is practically absent. This natural milk flavor which is obtained in the instant process makes it possible to add water and produce a milk comparable to pasteurized bottled milk as previously referred to.

It is essential that from the beginning of sterilization of the sealed can and throughout the entire sterilizing process, which as here used includes also cooling, the can be agitated violently. Agitation may be effected by constant turning of the can either end over end or on its longitudinal axis or both. Shaking of the can back and forth will also produce violent agitation as the word is used in the description and claims.

This action of agitation, it will be observed, is directly opposite to the recommendation of the Majonnier and Troy quotation above. It is also directly opposed to present day practices of the industry where an effort is made to avoid agitation as much as possible.

As a concrete example of violent agitation it may be mentioned that where a can is turned on its longitudinal axis this agitation may be at a speed equivalent to 200 turns of the can per minute. This figure will vary with the particular type of agitation, a turning of even 20 turns per minute end over end or an abrupt movement 20 times per minute being considered violent agitation as that term is used in the present case.

It will be understood that the effect of agitation as herein considered and as controlling viscosity is separate and distinct from any agitation effects upon the rate of heat penetration. This can best be shown, it is believed, by a concrete example.

Two cans of milk are agitated at the same rate during the first part of the process and until the entire contents of each can is brought to sterilizing temperature. The agitation effects as to heat penetration are therefore the same in both cans.

From this point one can continues through the remainder of the process with the same violent agitation herein described. The milk of that can will have the desired smooth texture and the proper viscosity when the process is completed.

The second can passes through the remainder of the process but without the violent agitation suggested. When the process is completed the milk of this can will be coagulated and commercially unfit.

Both cans have had the same heat penetration and the latter part of the sterilization period with the differing agitations does not alter the factor of heat penetration. The resulting differences in the milk of the two cans, however, show conclusively what a difference in viscosity and smoothness of texture agitation makes.

After sterilizing, the cans are labeled and boxed in any suitable manner, these steps being dependent upon the particular method used in the processing plant.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The art of processing evaporated milk to obtain a given viscosity which comprises evaporating the raw milk to a degree of over 29 per cent of total solids, sealing the evaporated product in cans, heating the enclosed product to raise its temperature to above 255° F., and flash sterilizing the evaporated product with a temperature above 255° F. while violently agitating the cans, and continuing the agitation of the cans until the conclusion of the sterilizing period, whereby the viscosity of the final milk product is controlled by the coincident use of the aforesaid predetermined degrees of evaporation, agitation and sterilizing temperature.

2. The art of processing evaporated milk to obtain a given viscosity which comprises, forewarming the raw milk, evaporating the raw milk to a degree of between 29 and 35 percent of the total solids, filling and sealing the evaporated product in cans, flash sterilizing the evaporated product in the cans at a temperature between 255° F. and 275° F. for a period ranging from 15 minutes to 3 minutes, to produce full sterilization, and violently agitating and cooling the cans while continuing the violent agitation thereof until the conclusion of the sterilizing and cooling periods, whereby the viscosity of the final milk product is controlled by the coincident use of the aforesaid predetermined degrees of evaporation, agitation and sterilizing temperature.

CHARLES O. BALL.